United States Patent
Sjostedt et al.

(10) Patent No.: US 11,879,208 B2
(45) Date of Patent: Jan. 23, 2024

(54) COMPOSITE CONTROL CABLES AND STABILIZING TENDONS FOR AIRCRAFT APPLICATIONS AND METHOD FOR MANUFACTURE OF SAME

(71) Applicant: Galactic Co., LLC, Mojave, CA (US)

(72) Inventors: Rob Sjostedt, Tehachapi, CA (US); Jeremiah Schwartz, Mojave, CA (US)

(73) Assignee: Galactic Co., LLC, Mojave, CA (US)

( * ) Notice: Subject to any disclaimer, the term of this patent is extended or adjusted under 35 U.S.C. 154(b) by 376 days.

(21) Appl. No.: 17/200,599

(22) Filed: Mar. 12, 2021

(65) Prior Publication Data

US 2022/0056640 A1    Feb. 24, 2022

Related U.S. Application Data

(60) Provisional application No. 62/989,149, filed on Mar. 13, 2020.

(51) Int. Cl.
*B29C 70/16* (2006.01)
*D07B 7/12* (2006.01)
(Continued)

(52) U.S. Cl.
CPC ............... *D07B 7/12* (2013.01); *B29B 15/14* (2013.01); *B29C 70/16* (2013.01); *B64C 13/30* (2013.01); *D07B 5/00* (2013.01); *D07B 2205/205* (2013.01); *D07B 2205/206* (2013.01); *D07B 2205/3007* (2013.01)

(58) Field of Classification Search
CPC ...... D07B 7/12; D07B 5/00; D07B 2205/205; D07B 2205/206; D07B 2205/3007; B29B 15/14; B29C 70/16; B64C 13/30
See application file for complete search history.

(56) References Cited

U.S. PATENT DOCUMENTS

| 2002/0009581 A1 | 1/2002 | Kishi et al. |
| 2009/0158984 A1 | 6/2009 | Sjostedt |

(Continued)

FOREIGN PATENT DOCUMENTS

| EP | 3388474 B1 | 10/2019 | |
| WO | WO-03033814 A1 * | 4/2003 | ........... B29C 53/564 |
| WO | WO-2016142786 A1 * | 9/2016 | ............. B29B 15/12 |

*Primary Examiner* — Vishal I Patel

(74) *Attorney, Agent, or Firm* — Weintraub Tobin; Jo Carothers

(57) ABSTRACT

Control and stabilizing cables and tendons for high altitude aircraft and airships having lightweight, high strength and low CTE are disclosed, along with a method and machine for fabrication of same. The cable is comprised of a fiber prepreg tow encased in a polymer sleeve with one bobbin at each end to facilitate connections. Consolidating the fiber prepreg tow along the length of the cable using high temperature shrink tubing, such as polyvinylidene fluoride (PVDF), allows for eliminating the twisting of the fiber prepreg tow, thus reducing the number of wraps around the bobbins. Eliminating the twists in the fiber prepreg tow also reduces the length of fiber needed, and therefore the overall change in length of the control cable with temperature variations is reduced. Additional cable strength can be achieved by adding and holding significant tension on the fiber prepreg tow by applying weight during the curing process.

14 Claims, 10 Drawing Sheets

(51) Int. Cl.
 B29B 15/14 (2006.01)
 B64C 13/30 (2006.01)
 D07B 5/00 (2006.01)

(56) References Cited

U.S. PATENT DOCUMENTS

2017/0130017 A1 5/2017 Okamoto et al.
2018/0265659 A1 9/2018 Okamoto et al.

\* cited by examiner

COMPOSITE CONTROL CABLES AND STABILIZING TENDONS FOR AIRCRAFT APPLICATIONS AND METHOD FOR MANUFACTURE OF SAME

CROSS-REFERENCE TO RELATED APPLICATIONS

This application claims priority under 35 USC Section 119(e) to U.S. Provisional Patent Application No. 62/989,149, filed on Mar. 13, 2020, the entire disclosure of which is incorporated herein by reference.

FIELD OF THE INVENTION

This invention relates generally to composite cables such as control cables and stabilizing tendons for high-altitude aircraft and airships, and an apparatus and method for making same.

BACKGROUND OF THE INVENTION

Aircraft and airships are subject to cold temperatures which has an effect on the aircraft structure. Specifically, high altitude aircraft that utilize mechanical flight controls comprised of control cables are subject to extreme thermal conditions. The control cables are used to actuate flying control surfaces for an aircraft such as ailerons, elevators, and rudders.

Steel wire rope has been the traditional control cable solution for these high altitude aircraft flight controls. However, the coefficient of thermal expansion (CTE) for steel wire rope requires the control cables to be slack on the ground in order to accommodate the shrinkage that occurs at high altitude due to cold temperatures.

High altitude aircraft typically have long wingspans for flight efficiency. Therefore, the length of the control cables, or control cable runs, are long and the effects of cold temperatures and cable CTE are exacerbated. Thus, a control cable that has a lower CTE and that can be optimally adjusted on the ground and not become overly tight at high altitudes would be advantageous and beneficial.

Carbon fiber offers a potential solution to this problem because carbon fiber has a slightly negative coefficient of expansion allowing the cables to be adjusted optimally on the ground and not become overly tight during high altitude flight.

Similarly, airships often require stabilizing cables, or tendons, for large stabilizing fins and propulsion pylons. These stabilizing cables need to be lightweight and high strength. Even though airships do not fly at high altitudes, they can fly in cold weather conditions and it is important for the stabilizing cables not to change dramatically in length with temperature changes. Additionally, the stabilizing cables may require lightning strike protection.

Carbon fiber control cables have been successfully made and flown on prototype high altitude aircraft. These carbon fiber cables are used for the straight runs and traditional steel wire rope cables are used for the portions of the control cables that are redirected over pulleys. Clevis pin connections link the carbon fiber cables with the steel wire rope cables. The portions of steel wire rope cables are kept as short as possible by design.

However, there is a need on high altitude aircraft having mechanical flight controls for stronger control cables with less strength variation from part to part and having lighter weight, higher tensile strength, and lower CTE, and for a method and apparatus for manufacture of same.

Airships, such as blimps, typically have large vane like tail surfaces that provide horizontal and vertical stability and control. These blimp tail fins need to be very light weight. A common practice is to use metallic wire rope tension members as stabilizing tendons to stabilize these lightweight tail fins on large blimps. Therefore, there is also a need for a composite stabilizing cable or other tension member that is lighter weight than the steel wire rope that is typically used.

BRIEF SUMMARY OF THE INVENTION

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a stronger carbon fiber control cable with less strength variation from part to part and process and tools for manufacture of same is disclosed. Unlike prior art cables, this stronger carbon fiber control cable is created by eliminating the twisting of the resin-impregnated carbon fiber bundle, or carbon fiber prepreg tow, during fabrication. Consolidating the carbon fiber prepreg tow along the length of the cable using high temperature shrink tubing, such as polyvinylidene fluoride (PVDF), allows eliminating the twisting of the carbon fiber prepreg tow and reduces the number of wraps of the carbon fiber prepreg tow around the bobbins that are needed for the same strength cable.

Eliminating the twists in the carbon fiber prepreg tow also significantly increases the ultimate tensile strength of the control cable. Additionally, eliminating the twists in the carbon fiber prepreg tow reduces its length, and therefore the overall length change of the control cable with temperature variations is further reduced.

Additional control cable strength can be achieved relative to the prior art by adding and holding significant tension on the carbon fiber prepreg tow by applying weights during the curing step. In one embodiment, the control cable strength is more than doubled by eliminating the twisting of the carbon fiber bundle and adding weight to tension the carbon fiber prepreg tow during cure. In one example, the ultimate tensile strength is increased from 5,000 lbs. to 13,000 lbs.

In an alternative embodiment, control cables can also be made with aramid fiber prepreg using the same disclosed manufacturing process and tools, for applications where a conductive fiber is not desirable. However, in the case of aramid fiber cables, the shrink tube cover can include an ultraviolet light blocking additive or filler to protect the aramid fiber from degradation due to ultraviolet light.

In an alternative embodiment, carbon fiber prepreg tow or aramid fiber prepreg tow can be used in conjunction with the invention disclosed herein to make stabilizing cables or tendons for aircraft and airship structures and other tension member applications using manufacturing method.

In certain aircraft and airship applications, lightning strike protection can also be incorporated into the cables and tendons by adding an outer layer of wire mesh or other conductive surface material and crimping it to the bobbins or integrated wedge bobbin at the ends of the cables and tendons.

Accordingly, one or more embodiments of the present invention overcomes one or more of the shortcomings of the known prior art.

For example, in one embodiment, a method for fabrication of a fiber cable comprises the steps of providing a fiber prepreg tow comprising a plurality of fiber filaments pre-impregnated with epoxy resin; providing a manufacturing tool comprising a first tooling pin and a second tooling pin; placing a first bobbin on the first tooling pin and a second bobbin on the second tooling pin; wrapping the fiber prepreg tow around the first bobbin and the second bobbin a plurality of times without twisting the fiber prepreg tow; installing a first wedge in a first end of the fiber prepreg tow to form a first split of the fiber prepreg tow; lashing the fiber prepreg tow at the first split of the fiber prepreg tow; removing the second bobbin from the second tooling pin; applying a shrink tube over the fiber prepreg tow; re-installing the second bobbin on the second tooling pin; installing a second wedge at a second end of the fiber prepreg tow to form a second split of the fiber prepreg tow; lashing the fiber prepreg tow at the second split of the fiber prepreg tow; tensioning the fiber prepreg tow; applying a shrink film over a portion of the fiber prepreg tow; applying a first fiber wrap at the first split; applying a second fiber wrap at the second split; and heating the fiber prepreg tow to consolidate and cure the fiber prepreg tow to form the fiber cable.

In this embodiment, the method can further comprise wherein the plurality of fiber filaments comprises a plurality of carbon fiber filaments; wherein the shrink tube comprises a PDVF shrink tube; wherein tensioning the fiber prepreg tow comprises using a weight; wherein sliding the second tooling pin while tensioning the fiber prepreg tow using the weight; wherein the plurality of fiber filaments comprises a plurality of aramid fiber filaments; wherein the shrink tube comprises an ultraviolet light blocking PDVF shrink tube.

In another example embodiment, a fiber cable is manufactured by a process comprising the steps of providing a fiber prepreg tow comprising a plurality of fiber filaments pre-impregnated with epoxy resin; providing a manufacturing tool comprising a first tooling pin and a second tooling pin; placing a first bobbin on the first tooling pin and a second bobbin on the second tooling pin; wrapping the fiber prepreg tow around the first bobbin and the second bobbin a plurality of times without twisting the fiber prepreg tow; installing a first wedge in a first end of the fiber prepreg tow to form a first split of the fiber prepreg tow; lashing the fiber prepreg tow at the first split of the fiber prepreg tow; removing the second bobbin from the second tooling pin; applying a shrink tube over the fiber prepreg tow; re-installing the second bobbin on the second tooling pin; installing a second wedge at a second end of the fiber prepreg tow to form a second split of the fiber prepreg tow; lashing the fiber prepreg tow at the second split of the fiber prepreg tow; tensioning the fiber prepreg tow; applying a shrink film over a portion of the fiber prepreg tow; applying a first fiber wrap at the first split; applying a second fiber wrap at the second split; and heating the fiber prepreg tow to consolidate and cure the fiber prepreg tow to form the fiber cable.

In this embodiment, the carbon fiber manufactured by the process can further comprise wherein the plurality of fiber filaments comprises a plurality of carbon fiber filaments; wherein the shrink tube comprises a PDVF shrink tube; wherein tensioning the fiber prepreg tow comprises using a weight; wherein sliding the second tooling pin while tensioning the fiber prepreg tow using the weight; wherein the plurality of fiber filaments comprises a plurality of aramid fiber filaments; wherein the shrink tube comprises an ultraviolet light blocking PDVF shrink tube.

In another example embodiment, a method for fabrication of a fiber cable comprises the steps of providing a fiber prepreg tow comprising a plurality of fiber filaments pre-impregnated with epoxy resin; providing a manufacturing tool comprising a first tooling pin and a second tooling pin; providing a first wedge bobbin comprising a first wedge portion and a first bobbin portion and providing a second wedge bobbin comprising a second wedge portion and a second bobbin portion; placing the first wedge bobbin on the first tooling pin and placing the second wedge bobbin on the second tooling pin; wrapping the fiber prepreg tow around the first bobbin portion of the first wedge bobbin and the second bobbin portion of the second wedge bobbin a plurality of times without twisting the fiber prepreg tow; forming a first split of the fiber prepreg tow at the first wedge portion of the first wedge bobbin; lashing the fiber prepreg tow at the first split of the fiber prepreg tow; removing the second wedge bobbin from the second tooling pin; applying a shrink tube over the fiber prepreg tow; re-installing the second wedge bobbin on the second tooling pin; forming a second split of the fiber prepreg tow at the second wedge portion of the second wedge bobbin; lashing the fiber prepreg tow at the second split of the fiber prepreg tow; tensioning the fiber prepreg tow; applying a shrink film over a portion of the fiber prepreg tow; applying a first fiber wrap at the first split; applying a second fiber wrap at the second split; and heating the fiber prepreg tow to consolidate and cure the fiber prepreg tow to form the fiber cable.

In this embodiment, the method can further comprise wherein the plurality of fiber filaments comprises a plurality of carbon fiber filaments; wherein the shrink tube comprises a PDVF shrink tube; wherein tensioning the fiber prepreg tow comprises using a weight; wherein sliding the second tooling pin while tensioning the fiber prepreg tow using the weight; wherein the plurality of fiber filaments comprises a plurality of aramid fiber filaments; wherein the shrink tube comprises an ultraviolet light blocking PDVF shrink tube.

In another example embodiment, a fiber cable is manufactured by a process comprising the steps of providing a fiber prepreg tow comprising a plurality of fiber filaments pre-impregnated with epoxy resin; providing a manufacturing tool comprising a first tooling pin and a second tooling pin; providing a first wedge bobbin comprising a first wedge portion and a first bobbin portion and providing a second wedge bobbin comprising a second wedge portion and a second bobbin portion; placing the first wedge bobbin on the first tooling pin and placing the second wedge bobbin on the second tooling pin; wrapping the fiber prepreg tow around the first bobbin portion of the first wedge bobbin and the second bobbin portion of the second wedge bobbin a plurality of times without twisting the fiber prepreg tow; forming a first split of the fiber prepreg tow at the first wedge portion of the first wedge bobbin; lashing the fiber prepreg tow at the first split of the fiber prepreg tow; removing the second wedge bobbin from the second tooling pin; applying a shrink tube over the fiber prepreg tow; re-installing the second wedge bobbin on the second tooling pin; forming a second split of the fiber prepreg tow at the second wedge portion of the second wedge bobbin; lashing the fiber prepreg tow at the second split of the fiber prepreg tow; tensioning the fiber prepreg tow; applying a shrink film over a portion of the fiber prepreg tow; applying a first fiber wrap at the first split; applying a second fiber wrap at the second split; and heating the fiber prepreg tow to consolidate and cure the fiber prepreg tow to form the fiber cable.

In this embodiment, the carbon fiber manufactured by the process can further comprise wherein the plurality of fiber filaments comprises a plurality of carbon fiber filaments; wherein the shrink tube comprises a PDVF shrink tube; wherein tensioning the fiber prepreg tow comprises using a weight; wherein sliding the second tooling pin while tensioning the fiber prepreg tow using the weight; wherein the plurality of fiber filaments comprises a plurality of aramid fiber filaments; wherein the shrink tube comprises an ultraviolet light blocking PDVF shrink tube.

Other objects, features, and advantages of the present invention will become apparent upon consideration of the following detailed description and the accompanying drawings.

DETAILED DESCRIPTION OF THE INVENTION

The following is a detailed description of embodiments to illustrate the principles of the invention. The embodiments are provided to illustrate aspects of the invention, but the invention is not limited to any embodiment. The scope of the invention encompasses numerous alternatives, modifications, and equivalents. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes and are not intended to limit the scope of the claims.

PRIOR ART

Figure 1:
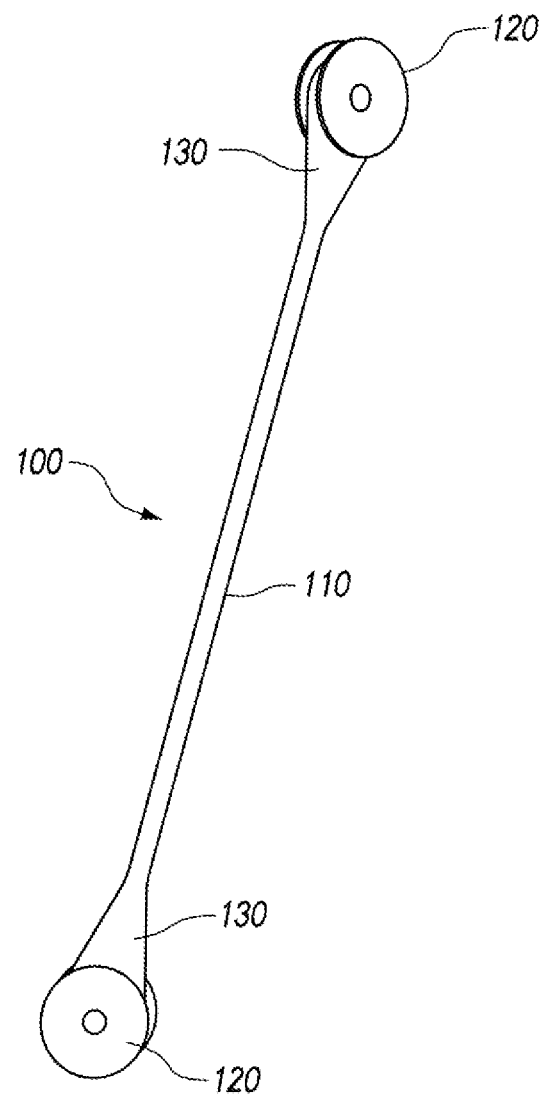
FIG. 1 illustrates an example of a prior art twisted carbon fiber control cable.

As shown in FIG. 1, prior art carbon fiber control cables 100 comprise winding carbon fiber tow 110 impregnated with room temperature curing epoxy resin around aluminum bobbins 120 that form the cable end connection points. The carbon fiber tow 110 is twisted before cure to hold the composite fibers together. The cables are hung vertically, and the epoxy allowed to cure. The void 130 where the twisted carbon tow separates to go around the aluminum bobbins 120 is filled with a mixture of epoxy and flocked cotton filler.

Prior art carbon fiber control cables 100 made by this prior art approach have lower ultimate tensile strength than desired for high-altitude aircraft and airship applications. And, the twists in the carbon fiber bundle increase the overall length of the carbon fiber bundle, and therefore increase the change in overall length of the control cable with temperature variations. In addition, these prior art carbon fiber control cables 100 also have undesirable and significant variation in ultimate strength from part to part due to the twist incorporated and variations in the angle where the fibers split at the voids 130 to go around aluminum bobbins 120.

Carbon Fiber Control Cables 200

Figure 2A:
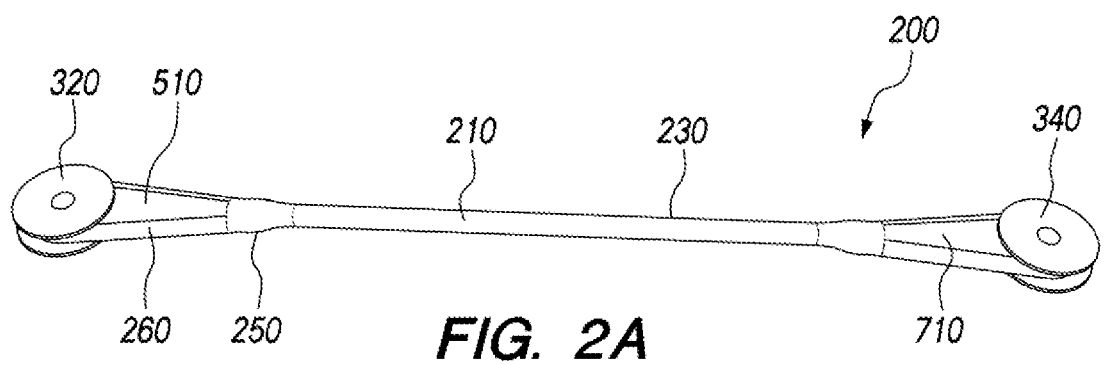
FIG. 2A illustrates an example embodiment of a carbon fiber control cable of the present disclosure.

Turning to FIG. 2A, an example embodiment of a carbon fiber control cable 200 in accordance with the present disclosure is shown. Carbon fiber prepreg tow 210, which contributes to the necessary carbon fiber control cable strength requirement, is wrapped between and around first bobbin 320 and second bobbin 340. The wrapping process can be done by hand or by a standard pin-wrap machine. The use of carbon fiber prepreg tow 210 contributes to the carbon fiber control cable 200 strength requirement for high altitude aircraft and airship applications.

Carbon fiber prepreg tow 210 comprises a plurality, or bundle, of carbon fiber filaments pre-impregnated with epoxy resin. The resin in the carbon fiber prepreg tow 210 is B-Staged (partially advanced in cure) so it has tack that facilitates handling. The advantage of using carbon fiber prepreg tow 210 is the fiber-to-resin content is precise and will result in minimal variation from part to part. The tack of the carbon fiber prepreg tow 210 also aids in the fabrication of the carbon fiber control cable 200 because it allows the carbon fiber prepreg tow 210 to stick together into a single compact bundle when wrapping the carbon fiber prepreg tow 210 between and around first bobbin 320 and second bobbin 340, thus allowing the shrink tube 230 to be easily slid over the carbon fiber prepreg tow 210.

High temperature and abrasion resistant shrink tube 230, such as PVDF shrink tube, is applied over the carbon fiber prepreg tow 210. Shrink tube 230 accomplishes several functions. First, it consolidates the carbon fiber prepreg tow 210 during cure into a package with a circular cross section that is essentially free of voids. In one example embodiment, the voids make up less than two percent of the volume. Second, the shrink tube 230 bonds to the carbon fiber prepreg tow 210 forming a protective jacket around the carbon fiber prepreg tow 210. An example shrink tube 230 meeting the preferred process parameters is made by one company under the trade name Kynar™, but other similar or equivalent PVDF shrink tubes can also be used.

Figure 2B:
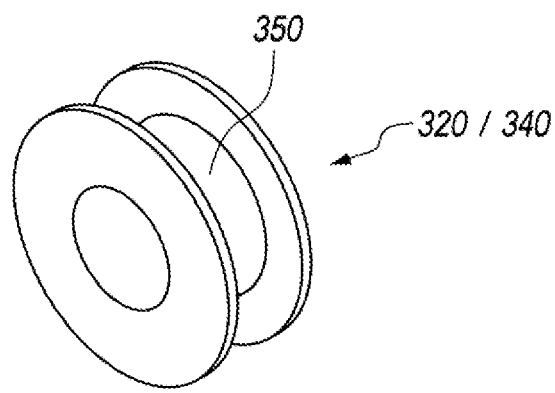
FIG. 2B illustrates an example embodiment of a bobbin for use in the carbon fiber control cable of the present disclosure.

FIG. 2B shows an example embodiment of first bobbin 320 and second bobbin 340. In one example embodiment, first bobbin 320 and second bobbin 340 are Type III hard anodized aluminum to prevent electrolysis between the aluminum and the carbon fiber prepreg tow 210. Alternatively, a layer of epoxy film adhesive can be applied over inner surface 350 of the first bobbin 320 and over inner surface 350 of the second bobbin 340 that is in contact with the carbon fiber prepreg tow 210.

In another example embodiment, titanium can also be used for first bobbin 320 and second bobbin 340 so they do not require Type III hard anodized aluminum. In another example embodiment, epoxy paint can be used to coat the inner surface 350 of first bobbin 320 and the inner surface 350 of the second bobbin 340 to prevent corrosion and electrolysis when first bobbin 320 and second bobbin 340 are in contact with the carbon fiber prepreg tow 210.

Figure 2C:
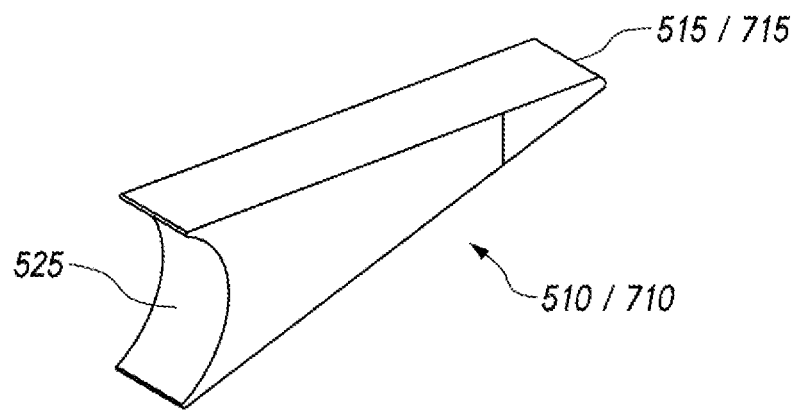
FIG. 2C illustrates an example embodiment of a wedge for use in the carbon fiber control cable of the present disclosure.

FIG. 2C shows an example embodiment of first wedge 510 with point end 515 and second wedge 710 with point end 715. First wedge 510 can also have a rounded end 525 to fit against inner surface 350 of first bobbin 320, and second wedge 710 can also have a rounded end 525 to fit against inner surface 350 of second bobbin 340. In one example embodiment, first wedge 510 and second wedge 710 are made of press molded fiberglass material commonly called G10. The fiberglass sheet is water-jet cut, machined, or saw cut to form rounded end 525 to fit to the inside surface 350 of the first bobbin 320 and the second bobbin 340.

In another example embodiment, epoxy micro-spheres can also be used for first wedge 510 and second wedge 710, but will not lead to the same level of consistency part to part. In another example embodiment, aluminum can also be used for first wedge 510 and second wedge 710.

Figure 2D:
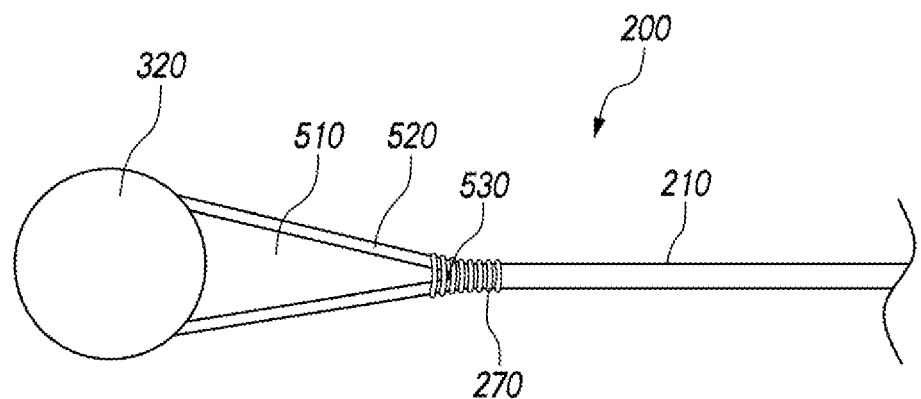
FIG. 2D illustrates a partial view of an example embodiment of a carbon fiber control cable of the present disclosure.

As shown in FIG. 2D, lashing 270 is used to lash carbon fiber prepreg tow 210 at the first split 530 of carbon fiber prepreg tow 210 to restrain the kick load at that point to prevent further spreading of carbon fiber prepreg tow 210 in the direction of first bobbin 320 or second bobbin 340 after the first split 530, adding to the strength and consistency of carbon fiber control cable 200. A kick load is a force vector that results when a cable is pulled straight. There is a force vector that bisects the kink angle and that is typically called a kick load. Lashing 270 restrains this kick load.

Figure 7:
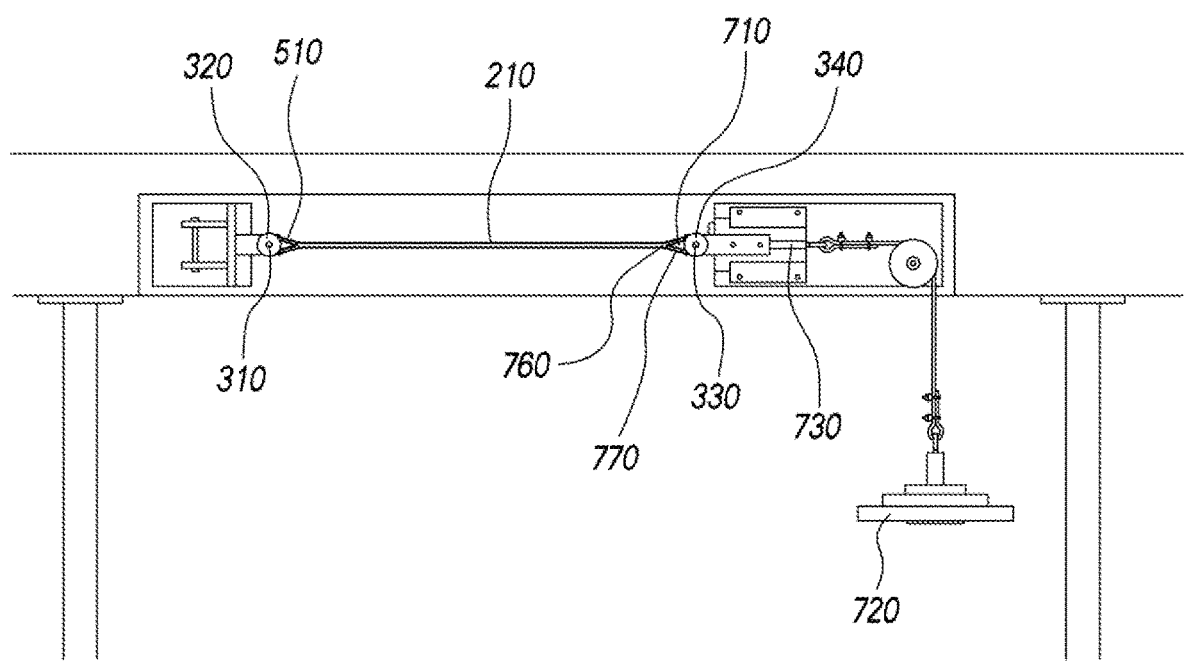
FIG. 7 illustrates the example embodiment of the carbon fiber prepreg tow under tension.

First wedge 510 and second wedge 710 ensure that the parting angle of the carbon fiber prepreg tow 210 is consistent from part to part as first wedge 510 is installed in a first end 520 of the carbon fiber prepreg tow 210, and second wedge 710 is installed in a second end 770 (as shown in FIG. 7) of the carbon fiber prepreg tow 210.

Figure 2E:
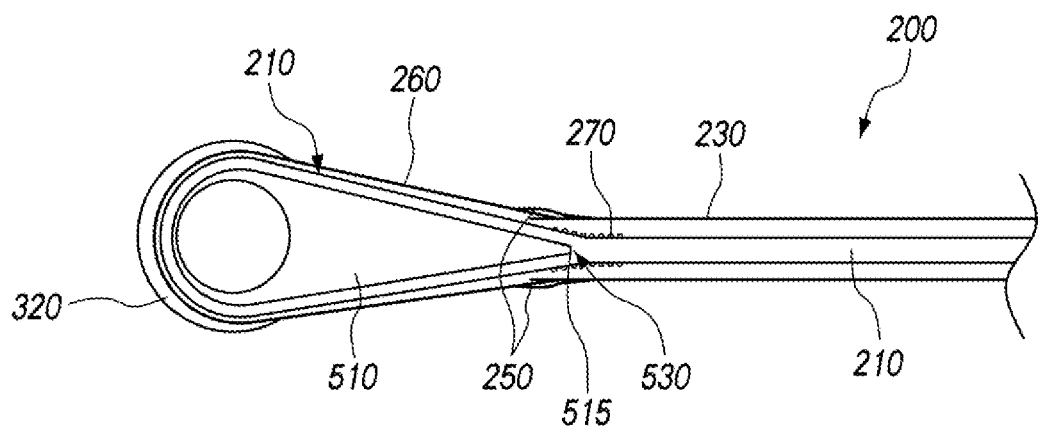
FIG. 2E illustrates a further partial view of an example embodiment of a carbon fiber control cable of the present disclosure.

As shown in FIG. 2E, in addition to shrink tube 230 that is applied over the carbon fiber prepreg tow 210, shrink film 260 is placed over and around carbon fiber prepreg tow 210 from the point where it splits at first split 530 to go around first bobbin 320 and splits at second split 760 (as shown in FIG. 7) to go around second bobbin 340. Carbon fiber wraps 250 are then applied at the first split 530 and the second split 760 where shrink tube 230 and shrink film 260 intersect. Carbon fiber wraps 250 prevent carbon fiber prepreg tow 210 from splitting further under high tensile loads.

Manufacturing Tool 300

Figure 3:
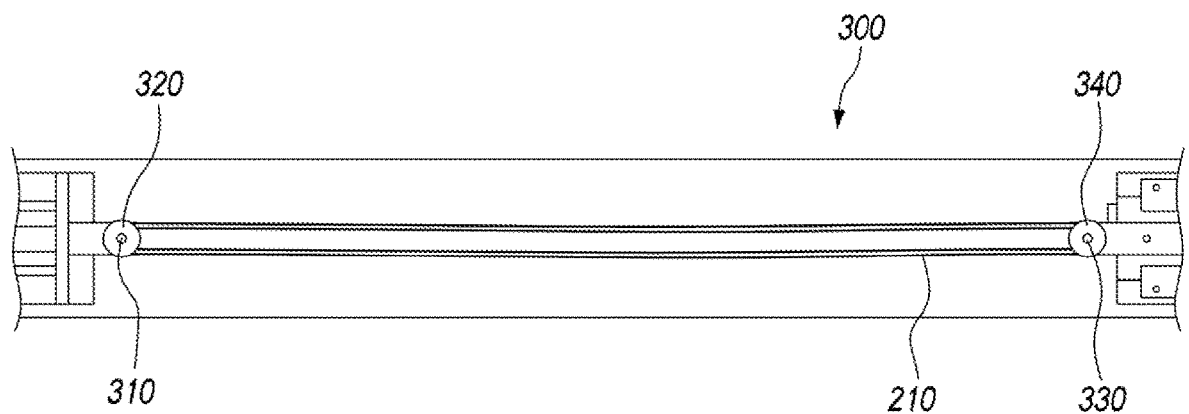
FIG. 3 illustrates an example embodiment of a manufacturing tool for manufacturing a carbon fiber control cable of the present disclosure with the first bobbin and second bobbin in place with the carbon fiber prepreg tow.
Figure 4:
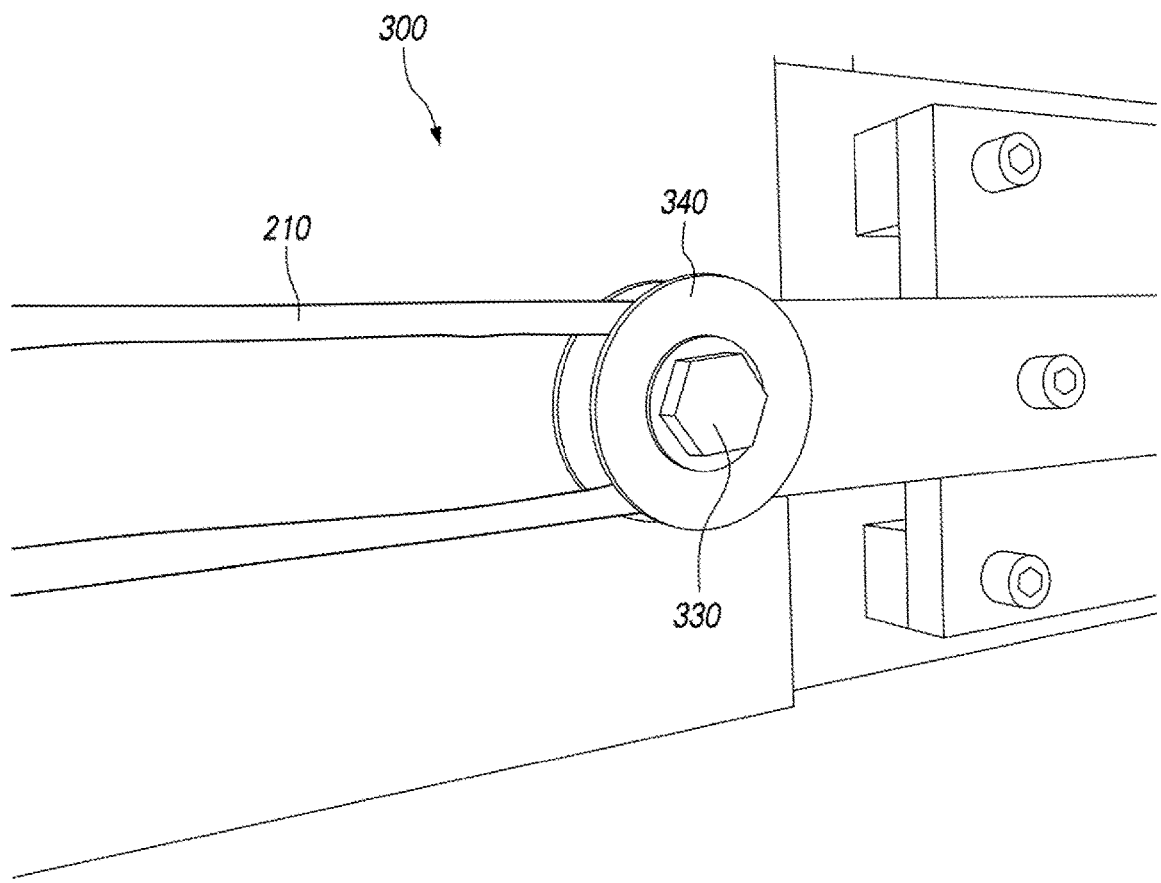
FIG. 4 illustrates an example embodiment of the interface of the carbon fiber prepreg tow and bobbin.

Turning to FIGS. 3 and 4, an example embodiment of a manufacturing tool 300 for forming the carbon fiber control cable 200 from the carbon fiber prepreg tow 210 is shown. First bobbin 320 is placed on first tooling pin 310 and second bobbin 340 is placed on second tooling pin 330. Carbon fiber prepreg tow 210 is wrapped between and around first bobbin 320 and second bobbin 340. First bobbin 320 and second bobbin 340 form the cable end connection points.

Figure 5:
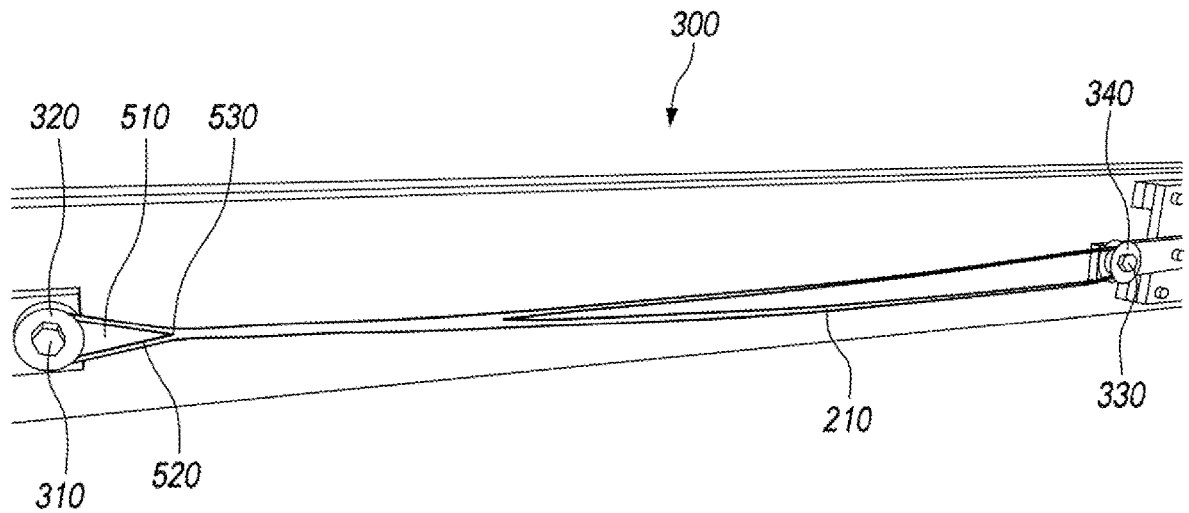
FIG. 5 illustrates an example embodiment of a first wedge in the carbon fiber prepreg tow.

As shown in FIG. 5, first wedge 510 is installed in a first end 520 of the carbon fiber prepreg tow 210. The carbon fiber prepreg tow 210 can be pinched together utilizing its tack to make it into a consolidated bundle with a first split 530 at the point end 515 of first wedge 510. First wedge 510 controls where the parting of the carbon fiber prepreg tow 210 goes around the first bobbin 320.

Alternate Wedge Bobbin 600

Figure 6:
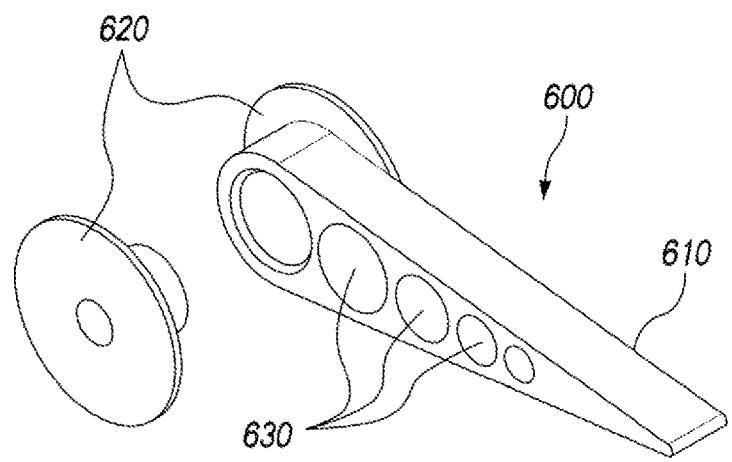
FIG. 6 illustrates an alternative embodiment of an integrated wedge and bobbin.

As shown in FIG. 6, in an alternate embodiment, wedge portion 610 can be integrated with bobbin portion 620, forming an integrated wedge bobbin 600. In this embodiment, for wedge bobbin 600, the wedge portion 610 is integrated with bobbin portion 620.

Incorporating lightening holes 630 in wedge bobbin 600 makes it the same weight as first wedge 510 and second wedge 710 made from G10. Alternatively, instead of incorporating lightening holes 630 in wedge bobbin 600, a wedge bobbin 600 can be made of aluminum with the wedge portion 610 machined to form an I-Beam cross section. Pockets can be machined in the sides of the wedge bobbin 600 such that its cross section becomes an I-Beam in shape. The sides are machined away from wedge portion 610 leaving a thin center web with flanges that support the carbon fiber prepreg tow 210.

Tensioning With Manufacturing Tool 300

Figure 8:
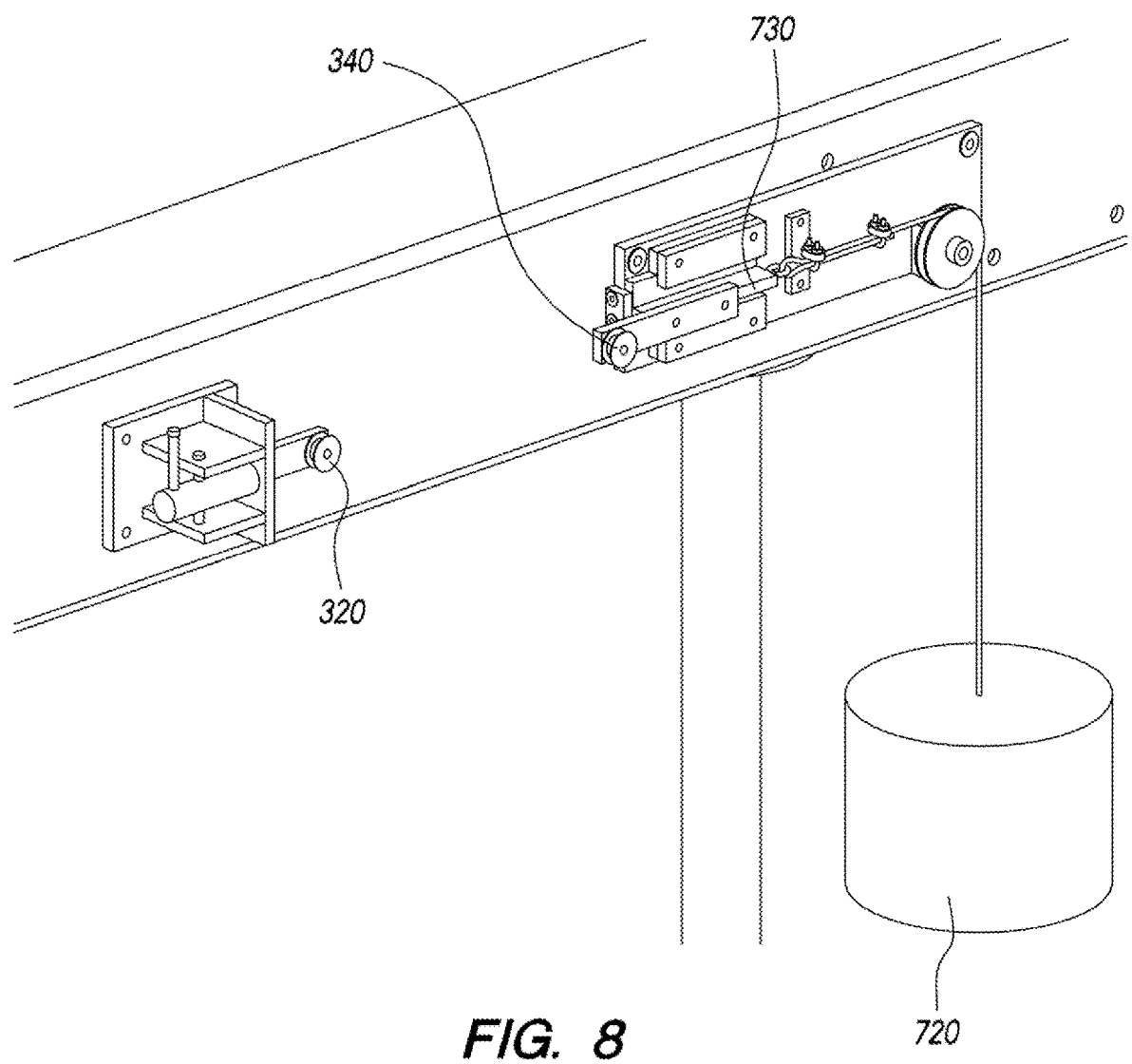
FIG. 8 illustrates the example embodiment of the carbon fiber prepreg tow under tension with a sliding bobbin.

As shown in FIGS. 7 and 8, weight 720 is used to tension the carbon fiber prepreg tow 210 during cure. Tensioning the carbon fiber prepreg tow 210 insures that each individual wrap of the carbon fiber prepreg tow 210 is equally loaded and equally contributes to the strength of the carbon fiber control cable 200.

In one embodiment, the second tooling pin 330 is on slide 730 allowing weight 720 to slide to apply tension. In one example embodiment, a total of 72 lbs. of weight can be used to tension a twenty tow wrap of carbon fiber prepreg tow 210. In the example embodiment, a twenty tow wrap of carbon fiber prepreg tow 210 can be formed by wrapping the carbon fiber prepreg tow 210 around first bobbin 320 and second bobbin 340 twenty times. In this example embodiment, there are forty individual carbon fiber prepreg tows 210 in the mid-span of carbon fiber control cable 200 between first bobbin 320 and second bobbin 340 and twenty individual carbon fiber prepreg tows 210 around each of the first bobbin 320 and second bobbin 340. The strength of carbon fiber control cable 200 is determined by the number of wraps of carbon fiber prepreg tow 210.

In one embodiment, the weight 720 is also used to facilitate forming the carbon fiber prepreg tow 210 to a desired length for carbon fiber control cable 200. The carbon fiber prepreg tow 210 is allowed to slip due to the force applied by the weight 720 until the exact length for carbon fiber control cable 200 is achieved. The end of the carbon fiber prepreg tow 210 is then secured to hold it to the desired length.

Manufacturing Process 900 for Control Cables

Figure 9:
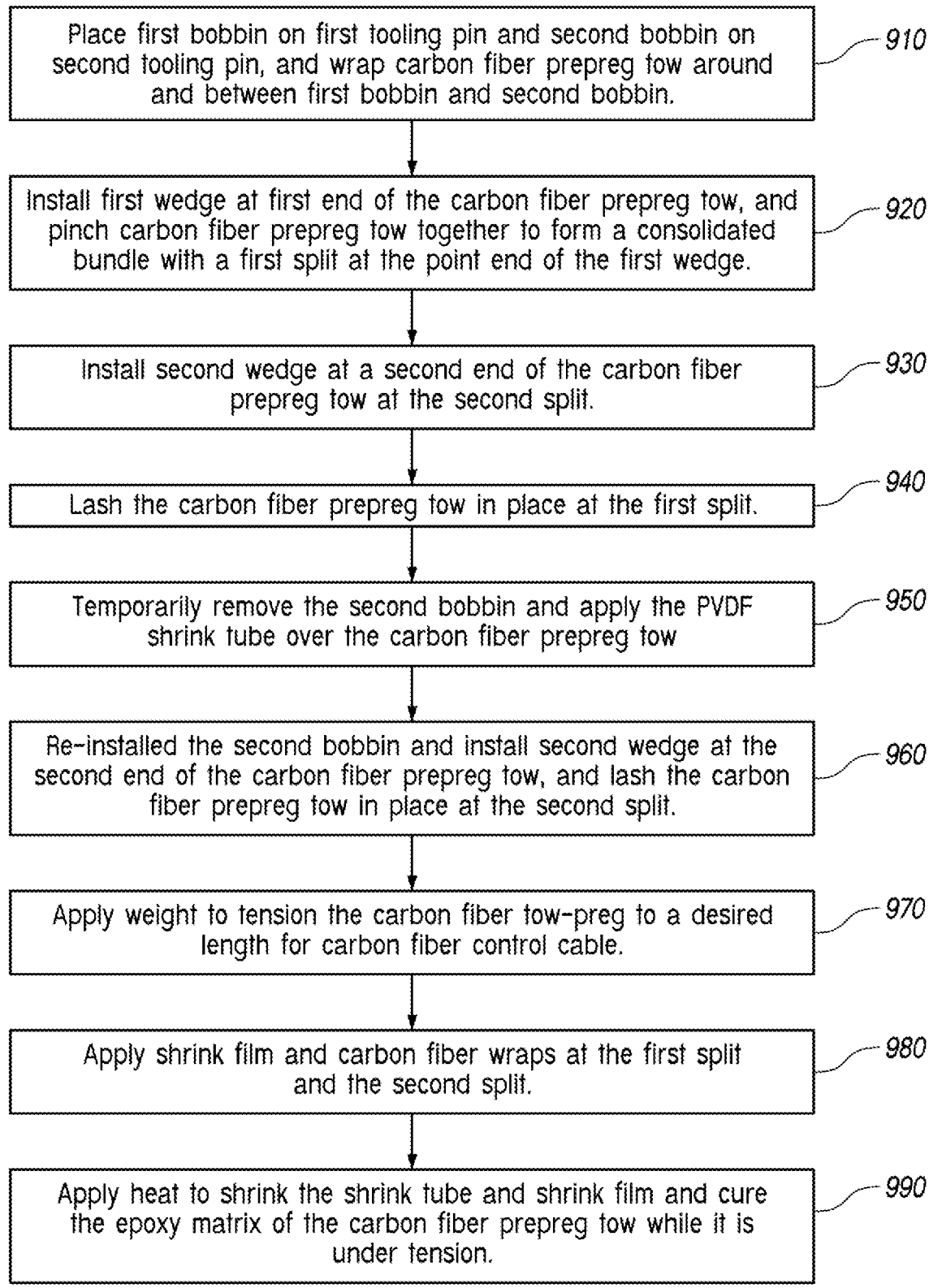
FIG. 9 illustrates an example flow diagram for the manufacturing process for a carbon fiber control cable of the present disclosure.

Turning to FIG. 9, the manufacturing process 900 to make a carbon fiber control cable 200 utilizing manufacturing tool 300 is shown.

At Step 910, first bobbin 320 is placed on first tooling pin 310 and second bobbin 340 on second tooling pin 330, and carbon fiber prepreg tow 210 is wrapped around and between first bobbin 320 and second bobbin 340. If wedge bobbin 600 is used in place first bobbin 320 and second bobbin 340, the bobbin portion 620 of each wedge bobbin 600 is placed over the first tooling pin 310 and second tooling pin 330, respectively, and carbon fiber prepreg tow 210 is wrapped between and around each bobbin portion 620.

At Step 920, first wedge 510 is installed in a first end 520 of the carbon fiber prepreg tow 210. Carbon fiber prepreg tow 210 is pinched together to form a consolidated bundle with a first split 530 at the point end 515 of the first wedge 510. If wedge bobbin 600 is used, carbon fiber prepreg tow 210 is pinched together to form a consolidated bundle with a first split 530 at the point end of the wedge portion 610.

At Step 930, second wedge 710 is installed at a second end 770 of the carbon fiber prepreg tow 210 at a second split 760. If wedge bobbin 600 is used, there is no additional wedge to install, but wedge portion 610 of the second wedge bobbin 600 is finally positioned at a second end 770 of the carbon fiber prepreg tow 210 at a second split 760.

Next, at Step 940, carbon fiber prepreg tow 210 is lashed in place with lashing 270 at the first split 530. Carbon fiber tow can be used for lashing 270. Using lashing 270 to lash carbon fiber prepreg tow 210 right at the first split 530 of carbon fiber prepreg tow 210 restrains the kick load at that point to prevent spreading of carbon fiber prepreg tow 210.

Next, at Step 950, shrink tube 230, such as PVDF shrink tube, is applied over the carbon fiber prepreg tow 210, which necessitates temporary removal of the second bobbin 340 or second wedge bobbin 600. In one example embodiment, shrink tube 230 is a high temperature and abrasion resistant PVDF shrink tube. In one embodiment, shrink tube 230 is in two lengths such that there is an overlap joint in the mid span of the carbon fiber prepreg tow 210. However, a single length or more than two lengths of shrink tube 230 may be used.

This joint allows for the shrink tube 230 to be pushed out to first wedge 510 and for air to escape the shrink tube 230 during curing of the carbon fiber prepreg tow 210. It will be apparent to one skilled in the art that a 4:1 shrinkage may be used for shrink tube 230 to be large enough to slide over carbon fiber prepreg tow 210 for long length cables yet still have enough shrinkage to consolidate the carbon fiber prepreg tow 210 during cure.

The amount of shrinkage shrink tube 230 undergoes and the temperatures required to shrink the shrink tube 230 relative to temperature to cure the carbon fiber prepreg tow 210 should be carefully controlled to work together. The heat profile should be tailored such that shrink tube 230 consolidates when the resin is at its lowest viscosity and before it starts to polymerize with tension weights applied. Shrink tube 230 should fully shrink down before the epoxy in the carbon fiber prepreg tow 210 begins to polymerize.

In one embodiment, shrink tube 230 will undergo its maximum shrinkage when the epoxy in the carbon fiber prepreg tow 210 is dropping in viscosity with heat. Hence, the consolidation of the carbon fiber prepreg tow 210 is accomplished before resin polymerization takes place.

At Step 960, after shrink tube 230 is applied over carbon fiber prepreg tow 210, second bobbin 340 can be reinstalled and second wedge 710 installed at second end 770 of the carbon fiber prepreg tow 710. If wedge bobbin 600 is used in place of the combination of second bobbin 340 and second wedge 710, the second wedge bobbin 600 is reinstalled in this step. At this point, the carbon fiber prepreg tow 210 is then lashed in place with lashing 270 at the second split 760.

At Step 970, weight 720 is applied to tension the carbon fiber prepreg tow 210 for a desired length for carbon fiber control cable 200. Carbon fiber prepreg tow 210 is then stabilized under tension, and shrink tube 230 is positioned in its final position.

At Step 980, after carbon fiber prepreg tow 210 is stabilized under tension, shrink tube 230 is positioned in its final position. Shrink film 260 is placed over and around carbon fiber prepreg tow 210 from the point where it splits to go around first bobbin 320 at first split 530 and around second bobbin 340 at second split 760, or bobbin portion 620 if wedge bobbin 600 is used. Carbon fiber wraps 250 are then applied at the first split 530 and the second split 760. Carbon fiber wraps 250 prevent carbon fiber prepreg tow 210 from splitting further under high tensile loads.

At Step 990, a heat source, such as an oven enclosure, is used to apply heat to shrink the shrink tube 230 and shrink wrap 260 and cure the epoxy matrix of the carbon fiber prepreg tow 210 while it is under tension.

In one embodiment, a typical cure ramps up from ambient temperature to 350 degrees Fahrenheit and is held at that higher temperature for a minimum of 2 hours. It is essential for the epoxy matrix to fully cure to achieve maximum strength for the carbon fiber control cable 200. In an alternative embodiment, the carbon fiber control cable 200 can be removed after an initial cure and further cured in a second oven. The advantage of post curing the carbon fiber control cable 200 as a second process is it allows the next carbon fiber control cable 200 to be fabricated sooner using manufacturing process 900 to make a carbon fiber control cable 900 utilizing manufacturing tool 300 and a batch of completed carbon fiber control cables 200 can be oven post-cured together, which is more efficient.

Alternative Embodiment

Figure 10:
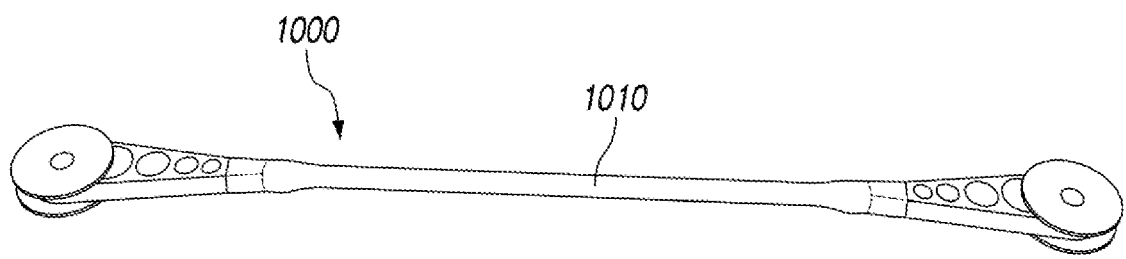
FIG. 10 illustrates an aramid fiber control cable or tension member in accordance with an example embodiment of the present disclosure.

In an alternative embodiment, as shown in in FIG. 10, aramid control cable 1000 can be made by substituting aramid fiber prepreg tow 1010 in place of the carbon fiber prepreg tow 210 in carbon fiber control cable 200 and using manufacturing process 900 and manufacturing tool 300 as disclosed herein. Aramid fiber prepreg tow 1010 is suitable for applications where a conductive fiber is not desirable.

However, in the case of aramid control cables 1000, shrink tube 230 may include an ultraviolet light blocking additive or filler to protect the aramid fiber from ultraviolet light degradation. In one embodiment, shrink tube 230 can comprise PDVF Kynar™ Shrink Tubing, which is available with black pigment that can be used as an ultraviolet light barrier.

Figure 11:
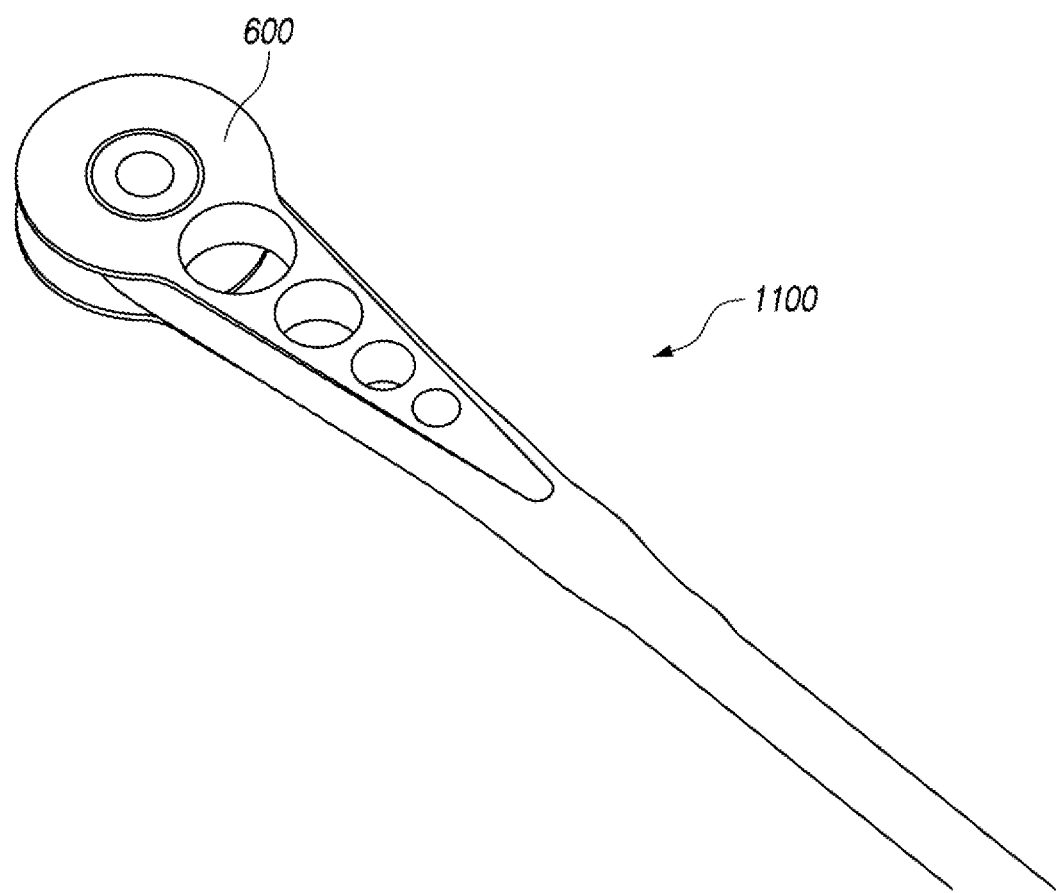
FIG. 11 illustrates an example embodiment of an alternative carbon fiber control cable with an integrated wedge and bobbin.

FIG. 11 shows control cable 1100 with wedge bobbin 600, which is an example of an alternative embodiment of carbon fiber control cable 200. Control cable 1100 with wedge bobbin 600 can be made with either carbon fiber prepreg tow 210 or aramid fiber prepreg tow 1010 using manufacturing process 900 and manufacturing tool 300 as disclosed herein. Alternative control cable 1100 with the wedge bobbin 600 has the same ultimate strength as a carbon fiber control cable 200 with first wedge 510 and second wedge 710 made from G10 or aluminum provided the wedge angle is the same, the manufacturing conditions such as winding tension and equivalent tensioning weight are the same, and oven cure conditions are the same.

Figure 12:
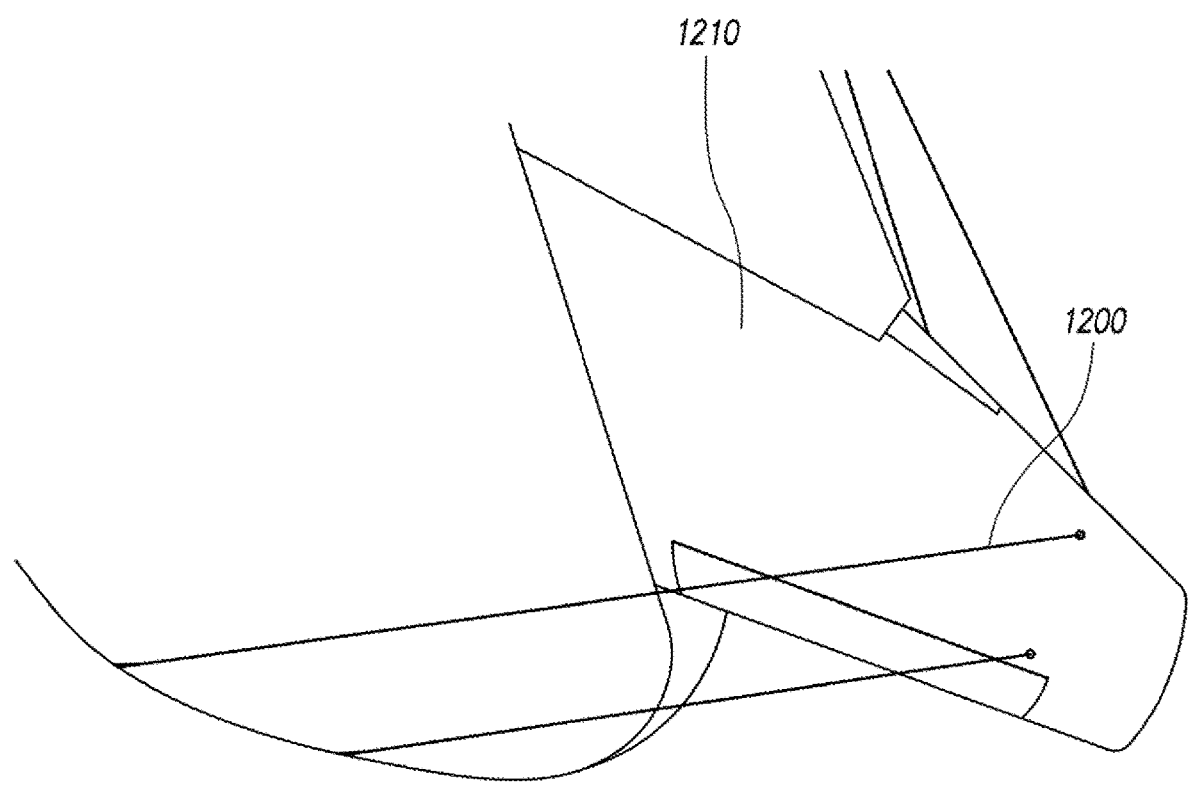
FIG. 12 illustrates an example embodiment of a tension member in accordance with an example embodiment of the present disclosure.

As shown in FIG. 12, in a further alternative embodiment, carbon fiber prepreg tow 210 or aramid fiber prepreg tow 1010 can be used with manufacturing tool 300 to make stabilizing cable 1200 and other tendon or tension member applications for aircraft and airship structures 1210 using manufacturing method 900.

In certain aircraft and airship applications, lightning strike protection can be incorporated into carbon fiber control cable 200, aramid control cable 1000, control cable 1100 with wedge bobbin 600, or stabilizing cable 1200 by adding an outer layer of wire mesh or other conductive surface material and crimping it to the first bobbin 320 and second bobbin 340 or to wedge bobbins 600, whichever is utilized.

While the invention has been specifically described in connection with certain specific embodiments thereof, it is to be understood that this is by way of illustration and not of limitation. Reasonable variations and modifications are possible within the scope of the foregoing disclosure and drawings without departing from the spirit of the invention.

We claim:

1. A method for fabrication of a fiber cable comprising:
providing a fiber prepreg tow comprising a plurality of fiber filaments pre-impregnated with epoxy resin;
providing a manufacturing tool comprising a first tooling pin and a second tooling pin;
placing a first bobbin on the first tooling pin and a second bobbin on the second tooling pin;
wrapping the fiber prepreg tow around the first bobbin and the second bobbin a plurality of times without twisting the fiber prepreg tow;
installing a first wedge in a first end of the fiber prepreg tow to form a first split of the fiber prepreg tow;
lashing the fiber prepreg tow at the first split of the fiber prepreg tow;
removing the second bobbin from the second tooling pin;
applying a shrink tube over the fiber prepreg tow;
re-installing the second bobbin on the second tooling pin;
installing a second wedge at a second end of the fiber prepreg tow to form a second split of the fiber prepreg tow;
lashing the fiber prepreg tow at the second split of the fiber prepreg tow;
tensioning the fiber prepreg tow;
applying a shrink film over a portion of the fiber prepreg tow;
applying a first fiber wrap at the first split;
applying a second fiber wrap at the second split; and
heating the fiber prepreg tow to consolidate and cure the fiber prepreg tow to form the fiber cable.

2. The method of claim 1 wherein the plurality of fiber filaments comprises a plurality of carbon fiber filaments.

3. The method of claim 2 wherein the shrink tube comprises a PDVF shrink tube.

4. The method of claim 1 wherein tensioning the fiber prepreg tow comprises using a weight.

5. The method of claim 4 further comprising sliding the second tooling pin while tensioning the fiber prepreg tow using the weight.

6. The method of claim 1 wherein the plurality of fiber filaments comprises a plurality of aramid fiber filaments.

7. The method of claim 6 wherein the shrink tube comprises an ultraviolet light blocking PDVF shrink tube.

8. A fiber cable manufactured by a process comprising the steps of:
providing a fiber prepreg tow comprising a plurality of fiber filaments pre-impregnated with epoxy resin;
providing a manufacturing tool comprising a first tooling pin and a second tooling pin;
placing a first bobbin on the first tooling pin and a second bobbin on the second tooling pin;
wrapping the fiber prepreg tow around the first bobbin and the second bobbin a plurality of times without twisting the fiber prepreg tow;
installing a first wedge in a first end of the fiber prepreg tow to form a first split of the fiber prepreg tow;
lashing the fiber prepreg tow at the first split of the fiber prepreg tow;
removing the second bobbin from the second tooling pin;
applying a shrink tube over the fiber prepreg tow;
re-installing the second bobbin on the second tooling pin;
installing a second wedge at a second end of the fiber prepreg tow to form a second split of the fiber prepreg tow;
lashing the fiber prepreg tow at the second split of the fiber prepreg tow;
tensioning the fiber prepreg tow;
applying a shrink film over a portion of the fiber prepreg tow;
applying a first fiber wrap at the first split;
applying a second fiber wrap at the second split; and
heating the fiber prepreg tow to consolidate and cure the fiber prepreg tow to form the fiber cable.

9. The fiber cable manufactured by the process of claim 8 wherein the plurality of fiber filaments comprises a plurality of carbon fiber filaments.

10. The fiber cable manufactured by the process of claim 9 wherein the shrink tube comprises a PDVF shrink tube.

11. The fiber cable manufactured by the process of claim 8 wherein tensioning the fiber prepreg tow comprises using a weight.

12. The fiber cable manufactured by the process of claim 11 further comprising sliding the second tooling pin while tensioning the fiber prepreg tow using the weight.

13. The fiber cable manufactured by the process of 8 wherein the plurality of fiber filaments comprises a plurality of aramid fiber filaments.

14. The fiber cable manufactured by the process of claim 13 wherein the shrink tube comprises an ultraviolet light blocking PDVF shrink tube.

* * * * *